United States Patent [19]

Mitsche et al.

[11] 4,046,713
[45] Sept. 6, 1977

[54] METHOD OF MANUFACTURING AN EXTRUDED CATALYST COMPOSITION

[75] Inventors: Roy T. Mitsche, Island Lake; Hillard L. Kuntz, Mount Prospect; John C. Hayes, Palatine, all of Ill.

[73] Assignee: UOP Inc., Des Plaines, Ill.

[21] Appl. No.: 625,417

[22] Filed: Oct. 24, 1975

Related U.S. Application Data

[63] Continuation-in-part of Ser. No. 400,290, Sept. 24, 1973, abandoned.

[51] Int. Cl.$^2$ .............................................. B01J 29/06
[52] U.S. Cl. .................................. 252/455 Z; 423/628
[58] Field of Search ................ 252/448, 455 Z, 463; 423/628

[56] References Cited

U.S. PATENT DOCUMENTS

| | | | |
|---|---|---|---|
| 2,662,860 | 12/1953 | Engel et al. | 423/628 X |
| 2,809,170 | 10/1957 | Cornelius et al. | 423/628 X |
| 3,140,253 | 7/1964 | Plank et al. | 208/120 |
| 3,403,109 | 9/1968 | Colgan et al. | 252/451 |
| 3,558,476 | 1/1971 | Robbins, Jr. et al. | 252/455 Z |
| 3,677,973 | 7/1972 | Mitsche | 252/455 Z |

*Primary Examiner*—Carl F. Dees
*Attorney, Agent, or Firm*—James R. Hoatson, Jr.; Robert W. Welch; William H. Page, II

[57] ABSTRACT

A method of preparing an extruded catalyst composition. An acidic alumina hydrosol is admixed with a dry mixture consisting essentially of a finely divided alumina and a finely divided crystalline aluminosilicate. The resulting mixture is extruded, dried and calcined to yield a catalyst particularly useful for the selective reforming of a naphtha fraction to produce a high octane reformate product and a liquid petroleum gas.

13 Claims, No Drawings

METHOD OF MANUFACTURING AN EXTRUDED CATALYST COMPOSITION

CROSS-REFERENCE TO RELATED APPLICATIONS

This application is a continuation-in-part application of a copending application Ser. No. 400,290 filed Sept. 24, 1973, now abandoned.

The present invention relates to a novel method of manufacturing a catalyst composition useful as a hydrocarbon conversion catalyst, particularly with respect to the reforming of gasoline boiling range feed stocks. The reforming of gasoline boiling range feed stocks to improve the octane rating thereof is a process well known to the petroleum industry. The feed stock may be a full boiling range fraction boiling in the 10°–220° C. range, although it is more often what is commonly referred to as naphtha — a gasoline fraction with an initial boiling point of from 65° to about 120° C. and an end boiling point of from about 175° to about 220° C. The catalyst prepared in accordance with the method of this invention is especially useful for the selective reforming of a naphtha fraction to produce a high octane reformate product and a liquid petroleum gas — principally $C_3$ and/or $C_4$ hydrocarbons — at reforming conditions.

It is an object of this invention to present a novel method of catalyst manufacture. For example, in one of its broad aspects, the present invention embodies a method of catalyst manufacture which comprises admixing an acidic alumina hydrosol with a dry mixture consisting essentially of a finely divided crystalline aluminosilicate, said crystalline aluminosilicate comprising from about 0.5 to about 20 wt. % of said dry mixture, and said hydrosol comprising from about 2 to about 10 wt. % of the resulting mixture; extruding said resulting mixture; and drying and calcining the extrudate.

I is a further object of this invention to present a novel method of manufacturing a catalyst composition especially useful for the selective reforming of a naphtha fraction to produce a high octane reformate product and a liquid petroleum gas. For example, one of the more specific embodiments of this invention concerns a method of manufacturing an extruded catalyst composition which comprises admixing an acidic aluminum chloride hydrosol and chloroplatinic acid with a dry mixture consisting essentially of a finely divided alpha-alumina monohydrate and a finely divided mordenite; adding sufficient water to the resulting mixture to form a dough extrudable at a pressure of from about 50 to about 150 psig; extruding said dough; and drying and calcining the extrudate at a temperature of from about 350° to about 850° C.

In a still more specific embodiment, an acidic aluminum chloride hydrosol and chloroplatinic acid are admixed with a dry mixture consisting essentially of a finely divided alpha-alumina monohydrate and a finely divided mordenite in the hydrogen form, said hydrosol containing from about 8 to about 14 wt. % aluminum in from about a 0.9 to about a 1.5 weight ratio with the chloride anion content thereof. Sufficient water is added to the mixture to form a dough extrudable at a pressure of from about 50 to about 150 psig. The resultant dough is subsequently extruded, and the extrudate dried and calcined at a temperature of from about 350° to about 850° C.

Other objects and embodiments of this invention will become apparent in the following detailed specification.

The finely divided alumina employed in the present method of manufacture may be any of the various aluminum oxides including aluminum oxide in the anhydrous or subsantially anhydrous form, or in the form of an aluminum oxide hydrate. Thus, the alumina can be an activated alumina such as eta- and/or gamma-alumina, or an alumina precursor thereof, for example alpha-alumina monohydrate (boehmite), alpha-alumina trihydrate (gibbsite) and/or beta-alumina trihydrate (bayerite) which, upon subsequent high temperature calcination and elimination of substantially all of the water and/or hydroxyl groups commonly associated therewith, will yield the high surface area activated form of the alumina. The alumina may be selected on the basis of its bulk density to yield a final extrudate product of predetermined bulk density, or aluminas of different bulk densities may be blended in any ratio to produce an extrudate product of desired bulk density. The present method is particularly adapted to the manufacture of extrudate particles of low bulk density, say less than about 0.5 grams per cubic centimeter, and of relatively high strength. The alumina will preferably be an aluminum oxide hydrate or blend of aluminum oxide hydrates characterized by a weight loss on ignition at 900° C. of less than about 30%, say from about 20 wt. % to about 30 wt. %.

In accordance with the method of this invention, the alumina, in a finely divided state, is dry mixed with a finely divided crystalline aluminosilicate. The crystalline aluminosilicates, hereinafter referred to as zeolites, are generally described as a three-dimensional network of fundamental structural units consisting of silicon-centered $SiO_4$ and aluminum-centered $AlO_4$ tetrahedra interconnected by a mutual sharing of apical oxygen atoms. To effect a chemical balance, each $AlO_4$ tetrahedra has a cation associated therewith, usually sodium. In most cases, the cation is subsequently exchanged with a hydrogen ion to yield the hydrogen or active form of the zeolite. The $SiO_4$ and $AlO_4$ tetrahedra are arranged in a definite geometric pattern often visualized either in terms of chains, layers or polyhedra, all formed by the linking of the tetrahedra. In any case, the zeolites comprise well-defined intracrystalline dimensions including intracrystalline channels and pore openings whose narrowest cross-section has essentially a uniform diameter. The various zeolites may be classified according to the geometric pattern of their framework with its attendant pore size, and by the $SiO_2/Al_2O_3$ mole ratio of their composition.

Mordenite is a preferred zeolite for use in accordance with the method of this invention. Mordenite is a zeolite highly silceous in nature, and generally characterized by $SiO_2/Al_2O_3$ mole ratio of from about 6 to about 12 as manufactured or found in its natural state. The mordenite crystal structure comprises four- and five-membered rings of $SiO_4$ and $AlO_4$ tetrahedra so arranged that the resulting cyrstal latice comprises pores and channels running parallel along the crystal axis to give a tubular configuration. This structure is unique among the zeolites since the channels or tubes do not intersect and access to the cages or cavities is in only one direction. For this reason, the mordenite structure is frequently referred to as two-dimensional. This is in contrast to other well-known zeolites, for example faujasite and Zeolite A, in which the cages can be entered from three directions. Conventional mordenite exhibits an unusual acid stability which is attributed to its siliceous nature, and the $SiO_2/Al_2O_3$ mole ratio of conventional mordenite can be further increased as to much as 50:1 or more by the technique of acid-leaching alumina therefrom while maintaining the mordenite crystal structure.

The amount of crystalline aluminosilicate dry-mixed with the finely divided alumina is suitably from about 0.5 to about 20 wt. % of said mixture, and preferably, when the crystalline aluminosilicate is mordenite, from about 2 to about 10 wt. %. By the expression "finely divided" is meant that the crystalline aluminosilicate is used in a particle size having an average diameter of from about 1 to about 105 microns, with the best results obtained with particles with an average diameter of less than 40 microns.

The acid alumina hydrosol component of the mixture serves not only as a source of alumina in the final catalyst product, but more importantly, as a binder and lubricant for the other components of the mixture during the extrusion process. The use of an acidic alumina hydrosol in accordance with the method of this invention thus eliminates the need of extraneous materials such as starch, polyvinyl, alcohol, hydrogenated vegatable oils, Sterotex, and the like, commonly employed in binders and/or lubricants in the extrusion process. The acidic alumina hydrosol herein contemplated includes such as a prepared by the hydrolysis of a suitable acid salt of aluminum, for example aluminum chloride, and reduction of the acid anion concentration of the solution, for example, the chloride anion concentration thereof. Reduction of the acid anion concentration can be accomplished by subjecting the aluminum salt solution to electrolysis utilizing an electrolytic cell with a porous partition between the anode and cathode. In this manner, an acid anion deficiency is created in the cathode compartment whereby an olation reaction is promoted with the formation of inorganic polymers of colloidal dimension dispersed and suspended in the remaining liquid. In some cases, as in the case of aluminum acetate, where the acid anion is sufficiently volatile, the reduction in acid anion concentration can be effected simply by heating. A particularly suitable method is in the use of aluminum metal as a neutralizing agent in conjunction with, for example, an aqueous aluminum chloride solution. In this instance, the salt of neutralization is itself a hydrolyzable aluminum salt subject to polymerization and ultimate sol formation. An aluminum chloride hydrosol, variously referred to as an aluminum oxychloride hydrosol, aluminum hydroxy hydrosol, and the like, is a preferred alumina hydrosol for use in a method of this invention. A particularly desirable aluminum chloride hydrosol is prepared by digesting aluminum metal in hydrochloric acid at about reflux temperature — usually a temperature of from about 80° to about 105° C., and reducing the chloride anion concentration of the resulting aluminum chloride solution by the device of maintaining an excess of aluminum reactant in contact with the reaction mixture as a neutralizing agent until a hydrosol containing aluminum and chloride anion in a ratio of from about 0.9:1 to about 1.5:1 is formed. The resulting hydrosol will typically have a pH in the range of from about 2 to about 5. The hydrosol is preferably prepared to contain less than about 14 wt. % aluminum, generally from about 12 to about 14 wt. %.

The extrusion operation is suitably effected with commercial extrusion apparatus, preferably at a pressure of from about 50 to about 150 psig. In the latter case, the extrusion process is facilitated by the addition of water to the extrusion mixture. While the acidic alumina hydrosol may be initially employed in a more diluted state to perform essentially the same function, the addition of water to the final mixture or dough is a preferred practice. For example, the described mixture, containing sufficient water added thereto to form a dough extrudableat from about 50 to about 150 psig, is continuously processed through a cylinder and pressured through a perforated plate at one end thereof by means of a rotating screw, the extrudate being cut into particles of desired length by means of a rotating knife. The perforated plate will comprise a multitude of perforations of an appropriate diameter to produce an extruded product of desired cross-sectional dimension.

After the mixture has been extruded, the extrudate particles are dried and calcined. Drying is usually effected at temperatures up to about 200° C. over a period of from 1 to about 24 hours. Calcination is preferably in an oxidizing atmosphere, such as air, at a temperature of from about 350° to about 850° C., and is suitably accomplished over a 2 to about a 4 hour period.

In one of the embodiments of this invention wherein the catalyst is manufactured to contain a platinum group metal component, a platinum group metal compound is preferably composited with the alumina starting material by impregnation and/or ion-exchange techniques and the resulting composite, in a finely divided state, admixed with the crystalline alumino silicate and alumina hydrosol with or without intermediate drying and/or calcination. As one alternative method, the platinum group metal compound can be added to the mixture dissolved in the alumina hydrosol. The platinum group metal component is preferably platinum, and chloroplatinic acid is a preferred platinum compound for inclusion in the extrusion mixture. The catalyst composition may be prepared to contain other platinum group metal components, i.e., palladium, ruthenium, rhodium, osmium and/or iridium, utilizing a platinum group metal compound such as polladium chloride, chloropalladic acid, rhodium trichloride, ruthenium tetrachloride, osmium trichloride, iridium dichloride, and the like, in the extrusion mixture. In any case, sufficient platinum group metal compound is included in the extrusion mixture to provide a final catalyst product containing from about 0.1 to about 2.0wt. % platinum group metal.

The catalyst of this invention is advantageously prepared to contain a halogen component to enhance the acidic function of the catalyst in the traditional manner. The halogen component may be chlorine, fluorine, bromine, iodine, or mixtures thereof. Of these, fluorine, and particularly chlorine, are often preferred. At least a portion of the halogen component can be added to the mixture as a halogen acid, for example hydrochloric acid, prior to extrusion. Halogen may also be introduced to the catalyst through the use of a platinum group metal compound which comprises a desired halogen. Another convenient means of incorporating at least a portion of the halogen component in the catalyst is by the use of the aforementioned aluminum chloride hydrosol. Regardless of the method of incorporating the halogen component, the finished catalyst product may be further treated with an appropriate halogen, or halogen acid, to add additional halogen thereto or treated with steam to reduce the halogen content thereof — the halogen component being limited to from about 0.1 to about 2.0 wt. % of the final catalyst product, and preferably from about 0.1 to about 1.5 wt. % thereof.

In the case where the catalyst of the present invention is used in a reforming process or a process for the production of LPG and a high octane reformate, the conversion system will comprise a conversion zone containing a fixed bed of the catalyst type previously characterized. This conversion zone may be one or more separate reactors with suitable heating means therebetween to compensate for the endothermic nature of the reactions that take place in each catalyst bed. The hydrocarbon feed stream that is charged to this conversion system in the reforming and LPG-production embodiments will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines and the like. On the other hand, it is frequently advantageous to charge thermally or catalytically cracked gasolines or higher boiling fractions thereof, called heavy naphthas. In some cases, it is also advantageous to charge pure hydrocarbons or mixtures of hydrocarbons that have been extracted from hydrocarbon distillates — for example, straight-chain paraffins — which are to be converted to aromatics. It is preferred that these charge stocks be treated by conventional catalytic pretreatment methods to remove at least a portion of the sulfurous, nitrogenous and water-yielding contaminants therefrom.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins or a normal butane-rich stock, or a normal hexane-rich stock, etc. In hydrocracking embodiments, the charge stock will be typically a gas oil, heavy cracked cycle oil, etc. In addition, alkyl aromatics can be conveniently isomerized by using the catalyst of the present invention. Likewise, pure hydrocarbons or substantially pure hydrocarbons can be converted to more valuable products by using the catalyst of the present invention in any of the hydrocarbon conversion processes known in the art that use an acidic catalyst.

In the reforming and LPG-production embodiments, an effluent stream is withdrawn from the conversion zone and passed through a condensing means to a separation zone, typically maintained at about 10° C. wherein a hydrogen-rich gas is separated from a high octaine liquid product, commonly designated as a reformate. Preferably, at least a portion of this hydrogen-rich gas is withdrawn from the separating zone and is then recycled through suitable compressing means back to the conversion zone. The liquid phase from the separating zone is then typically withdrawn and commonly treated in a fractionating system in order to recover LPG (i.e. liquefied petroleum gas) and other light ends and to produce a high octane reformate.

The conditions utilized in the numerous hydrocarbon conversion embodiments of the present invention are those customarily used in the art for the particular reaction, or combination of reactions, that is to be effected. For instance, alkyl aromatic isomerization reaction conditions include: a temperature of about 0° to about 535° C., pressures ranging from atmospheric to about 1500 psig, hydrogen to hydrocarbon mole ratios of from about 0.5:1 to about 20:1, and liquid hourly space velocities (LHSV) of from about 0.5 to 20. Typical alkylation conditions comprise a temperature of about 0° to 425° C., a pressure of about atmospheric to about 2000 psig, and a LHSV of about 1 to 20. Likewise, typical hydrocracking conditions include a pressure of about 400 to about 3000 psig, a temperature of from about 200° to about 480° C., a LHSV of about 0.1 to about 10, and hydrogen circulation rates of 1000 to 10,000 SCF per barrel of charge.

The following example is presented in illustration of the method of this invention and is not intended as an undue limitation on the generally broad scope of the invention as set out in the appended claims.

EXAMPLE

In the manufacture of an extruded catalyst composition in accordance with the method of this invention, particularly useful as a reforming catalyst to produce high octane reformate product and liquid petroleum gas, 130 grams of an alpha-alumina monohydrate having a 23% weight loss on ignition at 900° C. and an average bulk density of about 0.8 grams per cubic centimeter, and 137 grams of an alpha-alumina monohydrate having a 27% weight loss on ignition at 900° C. and an average bulk density of 0.36 grams per cubic centimeter, are thoroughly mulled and dry mixed with about 17 grams of mordenite in the hydrogen form, all components of the mixture comprising finely divided particles of a size 95% of which is recoverable through a 105 micron microsieve. 8.4 cubic centimeters of chloroplatinic acid containing 125 milligrams of platinum per cubic centimeter, and 10 grams of an aluminum chloride hydrosol are then admixed and blended with the alumina-mordenite mixture, the hydrosol having been prepared by digesting sufficient aluminum in dilute hydrochloric acid at about 102° C. to yield a hydrosol containing about 12 wt. % aluminum in about a 1.4:1 weight ratio with the chloride anion content thereof. A sufficient amount of deionized water is added to form a dough extrudable at 100 psig through a perforated disc containing perforations about 1/32" in diameter. The extrudate particles, dried and calcined in air at approximately 650° C., have an average bulk density of from about 0.4 to about 0.6 grams per cubic centimeter.

The catalyst composition thus prepared is effective to convert a naphtha feed stock to a high octane reformate product and substantial quantities of liquid petroleum gas at reaction conditions including a pressure in the 400-600 psig range, a temperature of from about 425° to about 575° C., a LHSV of from about 0.5 to about 5, and a hydrogen to hydrocarbon mole ratio of from about 5:1 to about 15:1.

We claim as our invention:

1. A method of preparing an extruded catalyst composition which comprises:
   a. admixing an acidic alumina hydrosol with a dry mixture consisting essentially of a finely divided alumina and a finely divided cyrstalline aluminosilicate, said crystalline aluminosilicate comprising from about 0.5 to about 20 wt. % of said dry mixture, and said hydrosol component comprising from about 2 to about 10 wt. % of the resulting mixture;
   b. extruding said resulting mixture while the last-mentioned component thereof is still in the hydrosol form; and
   c. drying and calcining the extrudate.

2. The method of claim 1 further characterized in that said finely divided alumina comprises at least about 50 wt. % alpha-alumina monohydrate.

3. The method of claim 1 further characterized in that said finely divided alumina comprises at least abut 50 wt. % beta-alumina trihydrate.

4. The method of claim 1 further characterized in that said crystalline aluminosilicate is mordenite.

5. The method of claim 1 further characterized in that said crystalline aluminosilicate comprises from about 2 to about 10 wt. % of said mixture.

6. The method of claim 1 further characterized in that said crystalline aluminosilicate is the hydrogen form of mordenite.

7. The method of claim 1 further characterized in that said extrudate is calcined at a temperature of from about 350° to about 850° C.

8. The method of claim 1 further characterized in that said alumina hydrosol is an aluminum chloride hydrosol.

9. The method of claim 1 further characterized in that said alumina hydrosol is an aluminum chloride hydrosol containing from about 8 to about 14 wt. % aluminum in from about 0.9 to about 1.5 weight ratio with a chloride anion content thereof.

10. The method of claim 1 further characterized in that said resulting mixture further comprises a platinum group metal compound added thereto.

11. The method of claim 1 further characterized in that said resulting mixure further comprises a platinum compound added thereto.

12. The method of claim 1 further characterized in that said resulting mixture further contains chloroplatinic acid added thereto.

13. The method of claim 1 further characterized in that sufficient water is added to said resulting mixture to produce a dough extrudable at a pressure of from about 50 to about 150 psig.

* * * * *